US005361191A

United States Patent [19]

Matsuzaki et al.

[11] Patent Number: 5,361,191

[45] Date of Patent: Nov. 1, 1994

[54] DEVICE FOR FITTING HEADLIGHT WITH A LAMP

[75] Inventors: Makio Matsuzaki, Tokyo; Koichi Kato; Shigeru Furuya, both of Yokohama, all of Japan

[73] Assignee: Stanley Electric Co., Ltd., Tokyo, Japan

[21] Appl. No.: 75,108

[22] Filed: Jun. 11, 1993

[30] Foreign Application Priority Data

Jun. 12, 1992 [JP] Japan .............................. 4-046819[U]
May 20, 1993 [JP] Japan .............................. 5-031255[U]

[51] Int. Cl.[5] .............................................. B60Q 1/04
[52] U.S. Cl. ..................................... 362/61; 362/226; 362/457
[58] Field of Search .................... 362/61, 80, 226, 396, 362/418, 440, 444, 457

[56] References Cited

U.S. PATENT DOCUMENTS

| | | | |
|---|---|---|---|
| 4,670,822 | 6/1987 | Baker | 362/61 |
| 4,682,274 | 7/1987 | Freudenreich et al. | 362/61 |
| 4,747,029 | 5/1988 | Liverance et al. | 362/226 |
| 4,760,506 | 7/1988 | Mochizuki et al. | 362/61 |
| 4,819,142 | 4/1989 | Lothamer et al. | 362/226 |
| 4,922,388 | 5/1990 | Freudenreich | 362/80 |

FOREIGN PATENT DOCUMENTS

3826106A1 2/1990 Germany .

*Primary Examiner*—Ira S. Lazarus
*Assistant Examiner*—Y. Quach
*Attorney, Agent, or Firm*—Frishauf, Holtz, Goodman & Woodward

[57] ABSTRACT

A device for fitting a vehicle headlight with a lamp includes a flange receiving portion for receiving a bayonet flange of the lamp, three recesses formed on the flange receiving portion for receiving three outer pawls radially projecting from the bayonet flange, and a substantially circular retainer spring made of a piano wire, a stainless steel wire or the like and adapted to be fastened to the flange receiving portion by threadably tightening three screws. Three substantially U-shaped retaining portions are formed along the retainer spring in an equally spaced relationship when viewed in a circumferential direction so as to enable each outer pawl to be firmly clamped between a bottom of each recess and a corresponding retaining portion of the retaining ring. When the lamp is fitted in the headlight, it is turned to a predetermined insertion position from the initial position wherein the outer pawls are initially received in the recesses formed on the flange receiving portion. To assure that the outer pawls of the bayonet flange are firmly held on the flange receiving portion without any necessity for threadably tightening screws, the outer pawls may be received in fitting slits that are provided between a plurality of slantwise upwardly extending projections and the bottom surfaces of the recesses formed on the flange receiving portion with the exception of one outer pawl. The slits have a substantially U-shaped retaining portion of the substantially circular retainer spring positioned thereon. Each of the slantwise upward extending projections is integrally formed with the flange receiving portion.

20 Claims, 3 Drawing Sheets

DEVICE FOR FITTING HEADLIGHT WITH A LAMP

BACKGROUND OF THE INVENTION

1. Field of the Invention

The present invention relates generally to a lighting instrument such as a headlight, an auxiliary headlight or the like for a vehicle. More particularly, the present invention relates to improvement of a device for fitting a headlight with a lamp for a vehicle.

2. Background Art

To facilitate understanding of the present invention, a typical conventional device for fitting a headlight with a lamp for a vehicle (hereinafter referred to simply as a device) will be described below with reference to FIG. 5. The device includes a lamp fitting portion 90 for a headlight 10 through which a lamp 20 is received in the interior of the headlight 10. The lamp 20 includes a bayonet flange 21 having three outer pawls 22 radially projecting therefrom. To receive the outer pawls 22 in the lamp fitting portion 90, three recesses 91a are formed on a flange holding portion 91 of the lamp fitting portion 90. As shown in FIG. 5, the flange holding portion 91 is integrated with the headlight 10. The upper end part of the headlight 10 is covered with a turnable cap 92. To firmly hold the outer pawls 22 in the recesses 91a, three cutouts 92*a* are formed on the cap 92, and moreover, the cap 92 includes three inner pawl portions 92*b* corresponding to the outer pawls 22.

When the headlight 10 is fitted with the lamp 20, first, the cutouts 92*a* on the flange holding portion 92 are located in alignment with the recesses 91*a* of the flange holding portion 91 so that the outer pawls 22 of the bayonet flange 21 are placed on the recesses 91*a* of the flange portion 91 through the cutouts 92*a* from above. The lamp 20 is inserted into the headlight 10 by passing past the circular opening defined by the three cutouts 92*a* and the three inner pawl portions 92*b* on the cap 92. Thereafter, the cap 92 is turned in a certain direction, e.g., in the clockwise direction until the outer pawls 22 are located below the inner pawl portion 92*b* in the overlapped state, resulting in the lamp 20 being firmly fitted in the headlight 10 with the aid of the device.

With the conventional device constructed in the above-described manner, however, various requests have been made by users for improving the present properties of the device. Typically, one of the requests is that the lamp 20 be located at the position where it is inserted into in the headlight 10 when the cap 92 is turned in a certain direction, e.g., in the counterclockwise direction, and subsequently, it is immovably held at the position where it is firmly fitted in the headlight 10 when the cap 92 is turned in the clockwise direction. Another request is that there does not arise a malfunction, wherein the cap 92 is readily disconnected from the flange portion 91 during running of a vehicle. Because of these requests, the conventional device becomes unavoidably complicated in structure, resulting in the device being fabricated at an increased cost.

SUMMARY OF THE INVENTION

The present invention has been made in consideration of the foregoing background.

An object of the present invention is to provide a cap-less device for fitting a headlight with a lamp for a vehicle wherein the device is constructed at an inexpensive cost without any necessity for a turnable member such as a turnable cap or the like.

Another object of the present invention is to provide a device for fitting a headlight with a lamp for a vehicle wherein the structure of the device is substantially simplified for reliably achieving each fitting operation.

According to one aspect of the present invention, there is provided a device for fitting a headlight with a lamp for a vehicle wherein the lamp includes a bayonet flange having a plurality of outer pawls each radially projecting therefrom so as to allow the lamp to be firmly held at a predetermined position which is turnably dislocated from an initial position thereof, wherein the device comprises: a flange receiving portion for receiving the bayonet flange of the lamp therein; a plurality of recesses formed on the flange receiving portion for receiving therein the outer pawls radially projecting outward of the bayonet flange, each of the recesses being dimensioned to have a width larger than that of each outer pawl and substantially the same depth as the thickness of each outer pawl; and a substantially circular retainer spring made of a wire-shaped material having excellent resiliency and adapted to be firmly fastened to the flange receiving portion by threadably fitting a plurality of screws into the corresponding female-threaded holes formed in the flange receiving portion and then tightening the screws, the retainer spring being dimensioned to have a diameter larger than the outer diameter of each outer pawl but smaller than the outer diameter of the flange receiving portion, and moreover, having a plurality of substantially U-shaped retaining portions formed to be in an equally spaced relationship when viewed in the circumferential direction of the flange receiving portion, each of the substantially U-shaped retaining portions being located at either of a left-hand half or a right-hand half of each recess so as to enable a corresponding outer pawl to be firmly held between the bottom surface of the recess and the substantially circular retainer spring in the clamped state when the lamp is turned to the predetermined position from the initial position and wherein the outer pawls are initially received in the recesses formed on the flange receiving portion.

Each of the substantially U-shaped portion is formed by inwardly bending the substantially circular retainer spring and has a width equal to or less than the width of each outer pawl wherein the bottom side of each substantially U-shaped retaining portion is-located outside an edge parting of the lamp.

Usually, each tightening screw is located at an intermediate position between adjacent recesses formed on the flange receiving portion.

In practice, the substantially circular retainer spring is firmly held between the upper surface of the flange receiving portion and the bottom of a head portion of each tightening screw.

In addition, each outer pawl is firmly held between the bottom surface of the corresponding recess and the corresponding retaining portion while the left-hand or right-hand end of the outer pawl comes in contact with the left-hand or right-hand end of the corresponding recess.

Further, according to another aspect of the present invention, there is provided a device for fitting a headlight with a lamp for a vehicle wherein the lamp includes a bayonet flange having a plurality of outer pawls each radially projecting therefrom so as to allow the lamp to be firmly held at the predetermined position that is turnably dislocated from the initial position thereof, wherein the device comprises a flange receiving portion for receiving the bayonet flange of the lamp therein; a plurality of recesses formed on the flange receiving portion for receiving therein the outer pawls radially projecting outward of the bayonet flange, each of the recesses being dimensioned to have a width larger than that of each outer pawl and substantially the same depth as the thickness of each outer pawl; a substantially circular retainer spring made of a wire-shaped material having excellent resiliency and adapted to be firmly fastened to the flange receiving portion, the substantially circular retainer spring being dimensioned to have a diameter larger than the outer diameter of each outer pawl but smaller than the outer diameter of the flange receiving portion, and moreover, having at least one substantially U-shaped retaining portion formed thereon, the substantially U-shaped retaining portion being located at either of a left-hand half or a right-hand half of the corresponding recess so as to allow the a corresponding outer pawl to be firmly held between the bottom surface of the corresponding recess and the substantially U-shaped retaining portion in the clamped state when the lamp is turned to the predetermined position from the initial position where the outer pawls are initially received in the recesses formed on the flange receiving portion; and a plurality of fitting slots each defined between a slantwise upward extending projection molded to be integral with the flange receiving portion and the bottom surface of each of the recesses exclusive of one recess having the substantially U-shaped retaining portion placed thereon so as to enable the corresponding outer pawl to be firmly held between the bottom surface of the corresponding recess and the corresponding slantwise upward extending projection in the clamped state when the lamp is turned to the predetermined position from the initial position where the outer pawls are initially received in the recesses formed on the flange receiving portion.

The substantially U-shaped retaining portion is formed by inwardly bending a part of the substantially circular retainer spring and has a width equal to or less than the width of the corresponding outer pawl wherein the bottom side of the substantially U-shaped retaining portion is located outside an edge portion of the lamp.

Each fitting slit is formed on the, operative side where each of the outer pawls exclusive of one outer pawl having the substantially U-shaped retaining portion placed thereon is firmly held between the bottom surface of the corresponding recess and the corresponding slantwise upward extending projection while the left-hand or right-hand end of the corresponding outer pawl is received in the corresponding fitting slit.

Other objects, features and advantages of the present invention will become apparent from a reading of the following description which has been made in conjunction with the accompanying drawings.

DETAILED DESCRIPTION OF THE PREFERRED EMBODIMENTS

The present invention will now be described in detail hereinafter with reference to the accompanying drawings which illustrate preferred embodiments thereof.

Figure 5:
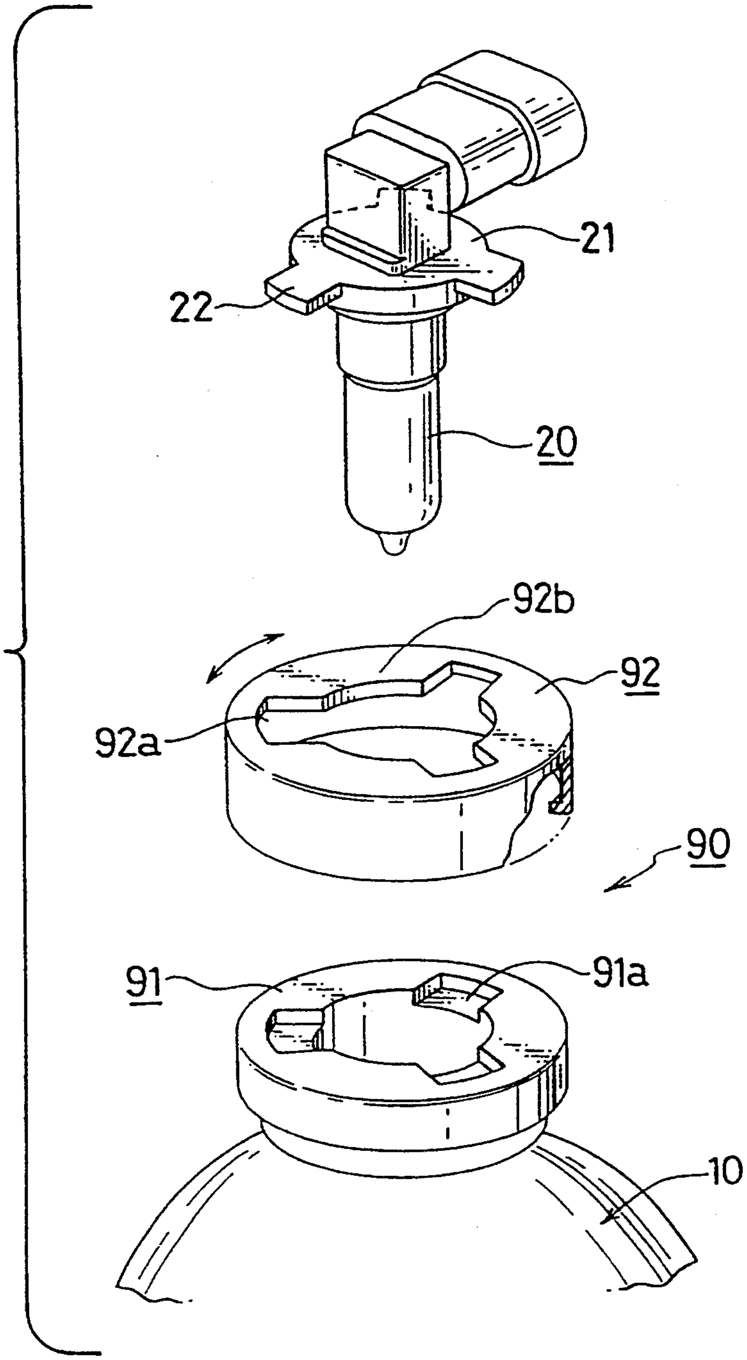
Fig. 5 (PRIOR ART)
FIG. 5 is a perspective view of a conventional device for fitting a headlight with a lamp for a vehicle.

First, a device for fitting a headlight with a lamp for a vehicle according to a first embodiment of the present invention will be described below with reference to FIG. 1 and FIG. 2. The same components as those constituting the conventional device of the foregoing type shown in FIG. 5 are represented by the same reference numerals.

In the drawings, reference numeral 1 generally designates a device for fitting a vehicle headlight with a lamp (hereinafter referred to simply as a device) wherein the device 1 is constructed according to the first embodiment of the present invention. The device 1 is substantially identical with the conventional device with the exception that a flange receiving portion 2 for receiving a bayonet flange 21 of a lamp 20 therein is designed in a different manner from that of the conventional device. Specifically, three recesses 2*a* are formed on the flange receiving portion 2 for receiving three outer pawls 22 projecting outward of the bayonet flange 21 therein, and each of the recesses 2*a* is dimensioned to have substantially the same depth as the thickness of each outer pawl 22.

In addition, the device 1 includes a retainer spring 3 made of a piano wire, a stainless steel wire or the like. The retainer spring 3 is designed in an arc-shaped contour in such a manner that it has an outer diameter larger than that of each outer pawl 22, and three substantially U-shaped retaining portions 3*a* are formed inside of the circular locus of the retainer spring 3.

Figure 1:
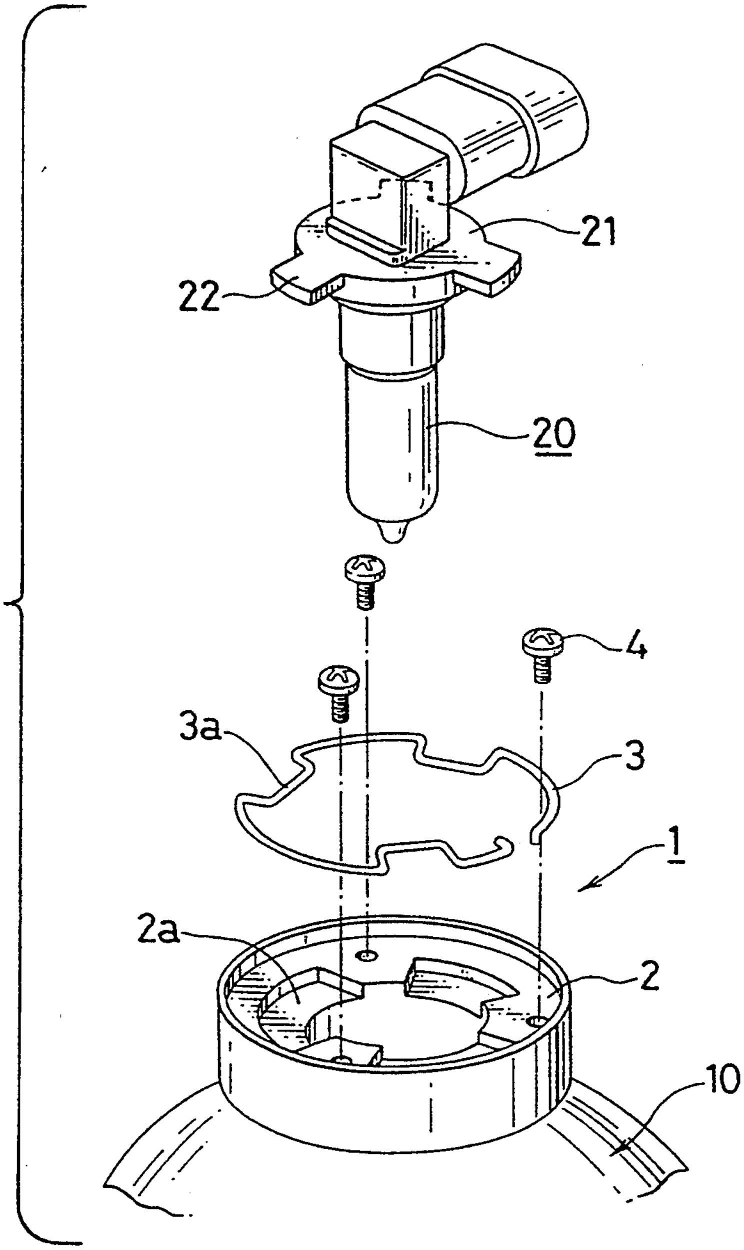
FIG. 1 is a perspective view of a device for fitting a headlight with a lamp for a vehicle according to a first embodiment of the present invention, particularly showing essential components constituting the device in the disassembled state.
Figure 2:
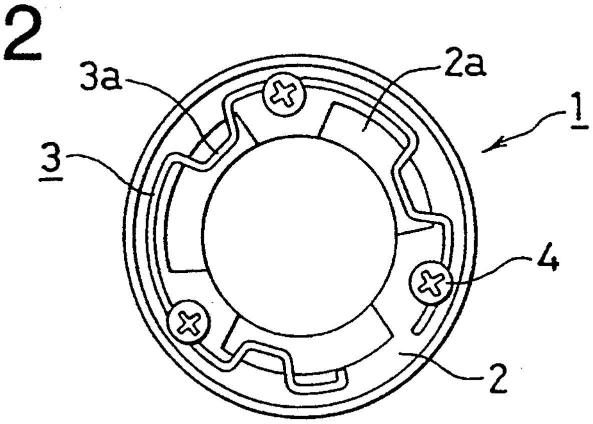
FIG. 2 is a plan view of the device shown in FIG. 1 wherein the device is seen in the direction of inserting of the lamp.

As is apparent from FIG. 1, the retainer spring 3 is firmly fastened to the flange receiving portion 2 by threadably fitting three screws 4 into the corresponding female-threaded holes formed in the flange receiving portion 2 and then tightening the screws 4. At the time of screw tightening, it is important that each retaining portion 3*a* is located at the right-hand part of the corresponding recess 2*a* as seen from above in the clockwise direction in FIG. 2 so as to enable the corresponding outer pawl 22 to be received below the retaining portion 3*a* without fail.

When a headlight 10 is fitted with a lamp 20 with the aid of the device 1, first, the left-hand end of each outer pawl 22 as seen in the counterclockwise direction in FIG. 1 is located in alignment with the left-hand end of each recess 2*a*, thereafter, the three outer pawls 22 are placed on the three recesses 2*a* from above, and subsequently, the lamp 20 is turned in the clockwise direction with an operator's hand so that each outer pawl 22 is firmly held between the bottom surface of the recess 2*a* and the retaining portion 3*a* of the retainer spring 3 in the clamped state by the resilient force of the retainer spring 3. The turning movement of the lamp 20 is stopped when the right-hand end of the outer pawl 22 comes in contact with the right-hand end of the recess 2*a* as seen in the clockwise direction. At this time, the lamp 20 is fitted to the headlight 10 at the correct position predetermined relative to the headlight 10.

Next, a device for fitting a headlight with a lamp for a vehicle (hereinafter referred to simply as a device) according to a second embodiment of the present invention will be described below with reference to FIG. 3 and FIG. 4. Similarly, the same components as those in the preceding embodiment are represented by the same reference numerals.

The device 1 constructed according to the second embodiment of the present invention is substantially identical with the device constructed according to the first embodiment with the exception that only a single retaining portion 3*a* is formed on a retainer spring 3 and no tightening screw is used for the device 1 in contrast with the first embodiment wherein three retaining portions 3*a* are formed along the arc-shape locus of the retainer spring 3 and three tightening screws 4 are used for the device 1. In other words, it is not necessary that the number of retaining portions 3*a* equal the number of recesses (three recesses in the shown case) formed on the retainer spring 3, and it suffices that the number of retaining portions 3*a* firmly hold the lamp 20 at a predetermined position in the device 1 (single retaining portion 3*a* in the second embodiment) is formed on the retainer spring 3.

Figure 3:
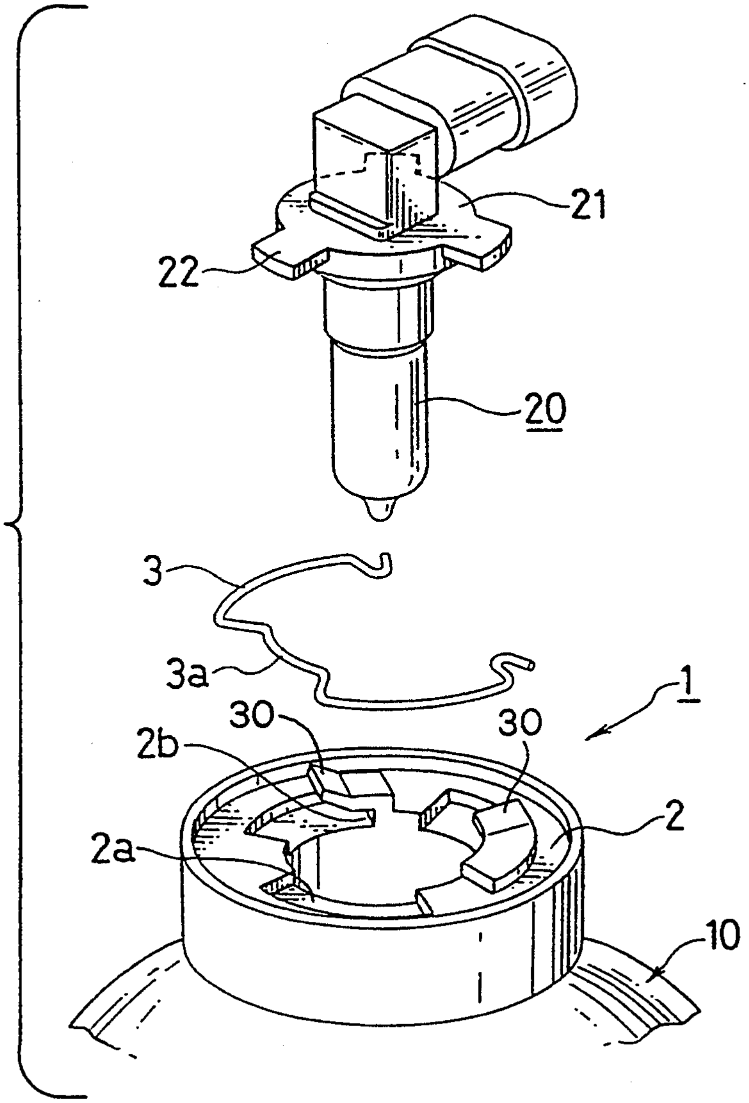
FIG. 3 is a perspective view of a device for fitting a headlight with a lamp for a vehicle according to a second embodiment of the present invention, particularly showing essential components constituting the device in the disassembled state.
Figure 4:
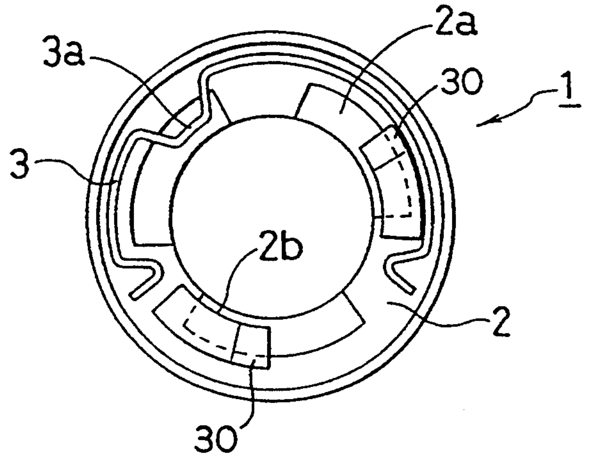
FIG. 4 is a plane view of the device shown in FIG. 3 wherein the device is seen in the direction of inserting of the lamp.

Specifically, a single retaining portion 3*a* is formed on the retainer spring 3 corresponding to one of the three recesses 2*a* formed on the flange receiving portion 2, and a fitting slot 2*b* is formed at the right-hand end of each of two recesses 2*a* as seen in FIG. 3 on which no retaining portion is formed. The fitting slot 2*b* is intended to firmly hold the corresponding outer pawl 22 of the bayonet flange 21 in the clamped state after the outer pawl 22 is received in the recess 2*a* and then turned in the clockwise direction with an operator's hand.

It should be noted that the fitting slot 2*b* does not serve to positively hold the outer pawl 22 between a slantwise upward extending projection 30 and the bottom surface of the recess 2*a* with a high intensity of clamping force enough to immovably retain the outer pawl 22 in the fitting slot 2*b* but it suffices that all the outer pawls 22 are received in the recesses 2*a* with the aid of the retaining portion 3*a* of the retainer spring 3 and the fitting slots 2*b* without an occurrence of rattling movement of a housing of the lamp 20. It is recommended that the fitting slots 2*b* and the slantwise upward extending projections 30 are formed integral with the flange receiving portion 2 using a synthetic resin by employing an injection molding process. A bent end of the retainer spring 3 retains the spring 3 on the projection of the flange receiving portion 2 which forms the fitting slot 2*b*.

When a headlight 10 is fitted with a lamp 20 with the aid of the device 1, first, the left-hand end of each outer pawl 22 as seen in the counterclockwise direction in FIG. 3 is located in alignment with the left-hand end of each recess 2*a*, thereafter, three outer pawls 22 are placed on three recesses 2*a* from above, and subsequently, the lamp 20 is turned in the clockwise direction with, an operator's hand so that one outer pawl 22 is firmly held between the bottom surface of the recess 2*a* and the retaining portion 3*a* of the retaining spring 3 in the clamped state, while the remaining two outer pawls 22 are firmly held in the fitting slots 2*b* in cooperation with the slantwise upward projections 30 of the flange receiving portion 2. The turning movement of the lamp 20 is stopped when the right-hand end of the one outer pawl 22 comes in contact with the right-hand end of the recess 2*a* and the remaining two outer pawls 22 are firmly received in the fitting slots 2*b*. At this time, the lamp 20 is fitted to the headlight 10 at the correct position predetermined relative to the headlight 10.

The second embodiment of the present invention has been described above with respect to the case where one retaining portion 3*a* is formed on the retainer spring 3. Alternatively, two or more retaining portions 3*a* may be formed on the retainer spring 3 as desired. It is recommended that the number of retaining portions be determined based on both the diameter of a wire material to be used for forming the retainer spring 3 a desired convenience for a fitting operation to be performed for the lamp 20.

In each of the aforementioned embodiments, a wire material such as a piano wire, a stainless steel wire or the like which has cut opposite ends is employed as a raw material. The present invention should not be limited only to a wire material. Alternatively, a sheet of steel having excellent resiliency can be used. The sheet of steel can be pressed worked to conform with the predetermined contour required for the retainer spring 3 so that it may be substituted for the wire material.

While the present invention has been described above with respect to two preferred embodiments thereof, it should of course be understood that the present invention should not be limited only to these embodiments but various change or modification may be made without departure from the scope of the present invention as claimed by the appended claims.

What is claimed is:

1. A device for fitting a vehicle headlight with a lamp, wherein said lamp includes a bayonet flange having a plurality of outer pawls that extend radially away from a central portion of said bayonet flange so as to enable said lamp to be firmly held at a turned predetermined position that is different from an initial insertion position of the lamp, the device comprising:

a bayonet flange receiving portion for receiving therein said outer pawls of said bayonet flange of said lamp;

a plurality of recesses formed in said flange receiving portion, a respective one of said plurality of recesses receiving therein a respective one of said outer pawls of said bayonet flange, each recess having a width dimension that is larger than a respective width dimension of said respective one of said outer pawls received therein, and said respective one of said plurality of recesses having a depth that is substantially equal to a thickness of said respective one of the outer pawls received therein;

a resilient wire-shaped retainer spring means positioned over said plurality of recesses of said flange receiving portion for firmly holding said plurality of outer pawls in said plurality of recesses;

said retainer spring means being formed to have a substantially circular shape that has a diameter that is larger than an outer diameter of said bayonet flange including said outer pawls; and said diameter of said substantially circular shape of said retainer spring means being smaller than an outer diameter of said flange receiving portion;

retainer means including at least one indented retaining portion formed in said retainer spring means, said at least one indented retaining portion being indented toward a central portion of said substantially circular shape of said retainer spring means;

said at least one indented retaining portion being positioned over at least one of said plurality of recesses for firmly holding in a clamped position, a respective one of said outer pawls received in said respective one of said recesses, said respective one of said outer pawls being held between a bottom surface of said respective one of said plurality of recesses and said at least one indented retaining portion, when said lamp is at said turned predetermined position;

wherein said plurality of outer pawls are initially received in said plurality of recesses of said flange receiving portion; and holding means for holding said retainer spring means on said flange receiving portion.

2. A device according to claim 1, wherein said holding means comprises:

at least one non-indented edge portion provided in said circular shape of said resilient retainer spring means;

at least one threaded screw hole formed in said flange receiving portion, said at least one screw hole being positioned to be opposite to said at least one non-indented edge portion of said resilient retainer spring means when said resilient retainer spring means is to be mounted on said flange receiving portion; and at least one screw, screwed into said at least one screw hole so that a head portion of said at least one screw firmly holds said at least one non-indented edge portion of said resilient retainer spring means to said flange receiving portion.

3. A device according to claim 2, wherein:

said retainer means includes at least three indented retaining portions; and at least three screws and at least three respective screw holes are respectively provided for holding said retainer spring means to said flange receiving portion.

4. A device according to claim 2, wherein said at least one screw is located at an intermediate position between adjacent recesses formed in said flange receiving portion.

5. A device according to claim 4, wherein said retainer spring means is firmly held between an upper surface of said flange receiving portion and a bottom portion of a head portion of said at least one screw.

6. A device according to claim 1, wherein said at least one retainer indented retaining portion has a substantially U-shape.

7. A device according to claim 6, wherein said retainer means comprises:

at least three substantially U-shaped indented retaining portions formed in said resilient spring means so as to be substantially equally spaced around the circular shape of said resilient retainer spring means; and each of said at least three substantially U-shaped indented retaining portions being positioned at one of a left-hand portion and a right-hand portion of each of said plurality of recesses so as to allow said respective one of said outer pawls received in said respective one of said recesses to be firmly held between a bottom surface of said respective one of said recesses and a respective one of said substantially U-shaped indented retaining portions of said circular shape of said retainer spring.

8. A device according to claim 7, wherein said respective one of said outer pawls is firmly held between said bottom surface of said respective one of said recesses and said at least one indented retaining portion while one of a left-hand and a right-hand end portion of said respective one of said outer pawls comes in contact with one of a left-hand and a right-hand end portion of said respective one of said recesses.

9. A device according to claim 6, wherein:

said at least one substantially U-shaped indented retaining portion has a width dimension that is no greater than a width dimension of said respective one of said outer pawls received in said respective one of said recesses so that a bottom side of said at least one substantially U-shaped indented retaining portion is located outside an edge portion of said lamp.

10. A device according to claim 6, further comprising:

a plurality of fitting slots respectively defined between a slantwise upwardly extending projection portion that is molded to be integral with said flange receiving portion and a bottom surface of each of said plurality of recesses, except one recess, that has said at least one substantially U-shaped indented retaining portion thereover so as to enable each of the respective one of the plurality of outer pawls to be firmly held between a bottom surface of a respective one of said plurality of recesses except said one recess, and a respective one of the slantwise upwardly extending projection portions when said lamp is at said turned predetermined position and wherein said outer pawls are initially received in said recesses formed on said flange receiving portion.

11. A device according to claim 10, wherein:

each fitting slot is formed on an operative side of said flange receiving portion to firmly clamp a pawl between said bottom surface of said respective one of the recesses and said respective one of the slantwise upwardly extending projection.

12. The device according to claim 10, wherein said at least one substantially U-shaped indented retaining portion comprises an inwardly bent portion that is bent toward a central portion of said substantially circular retainer spring so as to have a width that is no less than a width of said respective one of said outer pawls, a bottom side of said at least one of said substantially U-shaped indented retaining portion being positioned outside of an edge portion of said lamp.

13. A device according to claim 10, wherein said at least one indented retaining portion covers approximately one-half of the width of said respective recess.

14. A device according to claim 1, wherein the at least one indented retaining portion is formed in a plane in which said substantially circular shape of said retainer spring means is formed.

15. A device according to claim 1, wherein said at least one indented retaining portion covers approximately one-half of the width of said respective recess.

16. A device according to claim 1, wherein:

said retainer means comprises a plurality of indented retaining portions; and each of the indented retaining portions is positioned over a respective recess.

17. A device for fitting a vehicle headlight with a lamp, wherein said lamp includes a bayonet flange having a plurality of outer pawls that project radially away from said bayonet flange so as to enable said lamp to be firmly held at a turned predetermined position that is different from an initial insertion position of the lamp, the device comprising:

a cap-less flange receiving portion for receiving therein said plurality of outer pawls of said bayonet flange of said lamp;

a plurality of recesses formed in said flange receiving portion, each of said plurality of recesses:

respectively receiving therein a respective one of said plurality of outer pawls;

being dimensioned to have a width dimension that is larger than a width dimension of said respective one of said outer pawls received therein; and having a depth dimension that is substantially equal to a thickness of said respective one of said outer pawls received therein;

a substantially circular retainer spring formed from a resilient wire-shaped material, said retainer spring being adapted to be firmly fastened to said flange receiving portion with a plurality of screws, each screw being screwed into a respective one of a plurality of screw holes formed in said flange receiving portion;

said substantially circular retainer spring having a diameter that is larger than an outer diameter of said bayonet flange including said plurality of outer pawls, and being smaller than an outer diameter of said flange receiving portion;

said substantially circular retainer spring having a plurality of substantially U-shaped indented retaining portions that are substantially equally spaced therearound when viewed in a plane perpendicular to a circumference of said flange receiving portion, said plurality of substantially U-shaped indented portions being indented retaining toward a central portion of said substantially circular retainer spring;

each of said plurality of substantially U-shaped indented retaining portions being positioned at one of a left-hand portion and a right-hand portion of a respective one of said plurality of recesses so as to allow said respective one of said plurality of outer pawls to be firmly clamped between a bottom surface of said respective one of said recesses and a respective one of said plurality of substantially U-shaped indented portions of said substantially circular retainer spring when said lamp is at said turned predetermined position and wherein said outer pawls are initially respectively received in said plurality of recesses of said flange receiving portion.

18. The device according to claim 17, wherein each of said plurality of substantially U-shaped indented retaining portions comprises:

an inwardly bent portion of said substantially circular shaped retainer spring;

each U-shaped indented retaining portion having a width that is not greater than a width of the respective outer pawl received therein; and a bottom side portion of each of said plurality of substantially U-shaped indented retaining portions being located outside of an edge portion of said lamp.

19. The device according to claim 17, wherein each screw is positioned at an intermediate position between adjacent ones of said plurality of recesses formed in said flange receiving portion.

20. A device according to claim 17, wherein said respective one of said plurality of outer pawls is firmly held between said bottom surface of said respective one of said plurality of recesses and said respective one of said plurality of substantially U-shaped indented retaining portions positioned over said respective one of said plurality of recesses, when one of a left-hand and a right-hand end portion of said respective one of said outer pawls held in said respective one of said plurality of recesses comes in contact with said one of said left-hand and right-hand end portions of said respective one of said recesses.

* * * * *